US010787321B1

(12) United States Patent
Jennings

(10) Patent No.: US 10,787,321 B1
(45) Date of Patent: Sep. 29, 2020

(54) BI-WAY CONVEYOR SYSTEM FOR POWER STORAGE

(71) Applicant: Conveyor Dynamics, Inc., Bellingham, WA (US)

(72) Inventor: Andrew Jennings, Bellingham, WA (US)

(73) Assignee: Conveyor Dynamics, Inc., Bellingham, WA (US)

(*) Notice: Subject to any disclaimer, the term of this patent is extended or adjusted under 35 U.S.C. 154(b) by 100 days.

(21) Appl. No.: 16/289,554

(22) Filed: Feb. 28, 2019

Related U.S. Application Data

(60) Provisional application No. 62/636,622, filed on Feb. 28, 2018.

(51) Int. Cl.
*H02J 3/46* (2006.01)
*H02P 9/00* (2006.01)
*B65G 43/08* (2006.01)
*B65G 49/00* (2006.01)
*G05F 1/66* (2006.01)
*H02J 3/28* (2006.01)
*H02J 15/00* (2006.01)
*H02J 3/00* (2006.01)

(52) U.S. Cl.
CPC ............ *B65G 43/08* (2013.01); *B65G 49/00* (2013.01); *G05F 1/66* (2013.01); *H02J 3/28* (2013.01); *H02J 3/46* (2013.01); *H02J 3/003* (2020.01); *H02J 15/00* (2013.01)

(58) Field of Classification Search
CPC .. B65G 43/08; B65G 49/00; H02J 3/46; H02J 3/28; H02J 3/003; H02J 15/00; G05F 1/66

USPC ........................................................ 307/153
See application file for complete search history.

(56) References Cited

U.S. PATENT DOCUMENTS

| | | |
|---|---|---|
| 3,318,436 A | 5/1967 | Ray |
| 3,334,759 A | 8/1967 | Carl |
| 3,472,357 A | 10/1969 | Strocker |
| 3,881,590 A | 5/1975 | Hartmann |
| 4,444,236 A | 4/1984 | Kan et al. |
| 4,532,098 A | 7/1985 | Campbell et al. |

(Continued)

OTHER PUBLICATIONS

APS Panel on Public Affairs, "Integrating Renewable Electricity on the Grid," APS Physics, 40 pages, Nov. 2011.

(Continued)

*Primary Examiner* — Richard Tan
(74) *Attorney, Agent, or Firm* — Schacht Law Office, Inc.; Dwayne Rogge

(57) ABSTRACT

Disclosed herein is a method for converting energy between electric, kinetic, and potential and storing potential energy; the method comprising the steps of: providing a conveyor belt having a lower end, an upper end; the conveyor belt configured to convey conveyed material between the upper end and the lower end in both directions; providing an evaluation system configured to determine the electric power load on an electrical grid relative to the power supply on the electrical grid; a generator configured to generate electric power when the conveyor belt conveys the conveyed material from the high potential energy storage location to the low potential energy storage location; coupling a motor to the conveyor belt, the motor configured to provide motive force to the conveyor belt to convey the conveyed material from the low potential energy storage location to the high potential energy storage location.

9 Claims, 3 Drawing Sheets

(56) References Cited

U.S. PATENT DOCUMENTS

| | | |
|---|---|---|
| 6,185,847 B1 | 2/2001 | Russell et al. |
| 6,360,876 B1 | 3/2002 | Nohl et al. |
| 6,588,583 B2 | 7/2003 | Trieb |
| 8,593,012 B2 | 11/2013 | Peitzke et al. |
| 9,365,370 B2 | 6/2016 | Walker |
| 2012/0112472 A1 | 5/2012 | Murray et al. |

OTHER PUBLICATIONS

Jennings et al., "Case Study: correcting control problems on Essroc's multidrive station, horizontally curved conveyor," Transactions of the Society for Mining, Metallurgy, and Exploration, 2013 Transactions, vol. 334, 5 pages, 2013.

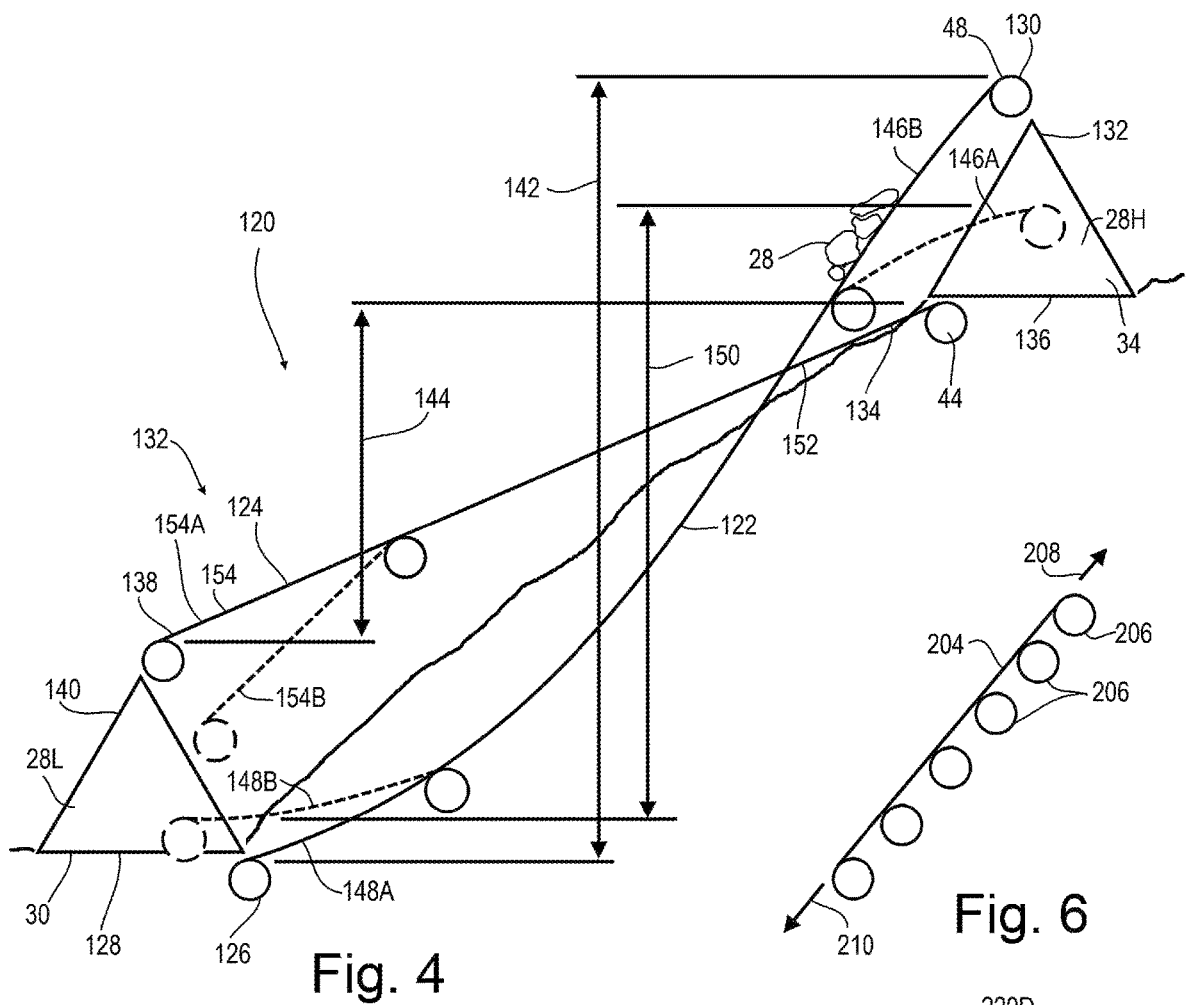
Fig. 4
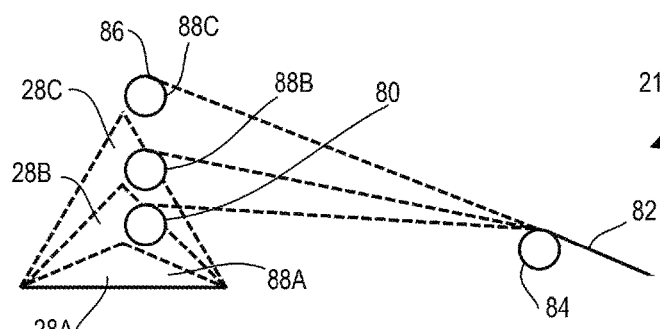
Fig. 5
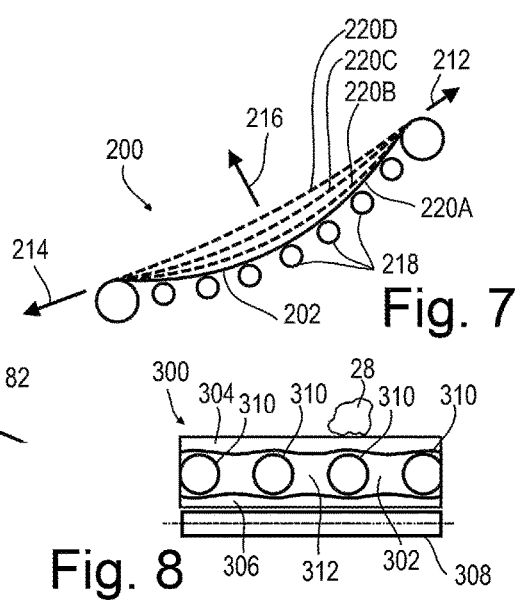
Fig. 6
Fig. 7
Fig. 8

US 10,787,321 B1

BI-WAY CONVEYOR SYSTEM FOR POWER STORAGE

BACKGROUND OF THE DISCLOSURE

Field of the Disclosure

The methods and apparatuses disclosed herein are in the field of energy storage. More specifically, this disclosure is directed to various embodiments of an energy storage device with a conveyor belt system, and methods of using the device to store energy mechanically using gravitational potential by moving material from a low potential energy storage location to a high potential energy storage location, and then converting the stored potential energy to kinetic energy, and converting the kinetic energy to electric energy as the body of conveyed material is moved by gravity from the high potential energy storage location to the low potential energy storage location.

BRIEF SUMMARY OF THE DISCLOSURE

Disclosed herein is a method utilizing a bi-way (bidirectional) conveyor system for power storage. The system utilized for converting energy between electric, kinetic, and potential and storing potential energy; the method in one example comprising the steps of: providing a conveyor belt system having at least one conveyor belt with a lower end, and an upper end.

The conveyor belt system configured to convey material between the upper end and the lower end in both directions. In one form the material being conveyed comprises material such as rock, stone, sand, mine tailings, or similar material easily moved and sufficiently dense.

The method in one example further comprising the steps of providing the material to be conveyed between the lower end and the upper end of the conveyor belt system in both directions; establishing a low potential energy storage location where the material is stored adjacent the lower end of the conveyor belt system; establishing a high potential energy storage location where the material is stored adjacent the upper end of the conveyor belt system; providing an evaluation system configured to determine the electric power load on an electrical grid relative to the power supply on the electrical grid; coupling a generator to the conveyor belt system; the generator configured to generate electric power when the conveyor belt conveys the material from the high potential energy storage location to the low potential energy storage location; the generator coupled to the electrical grid to provide electric power thereto; coupling a motor to the conveyor belt system, the motor configured to provide motive force to the conveyor belt system to convey the material from the low potential energy storage location to the high potential energy storage location; providing a low potential loading system configured to reposition the material from the low potential energy storage location to the conveyor belt system; providing a high potential loading system configured to reposition the material from the high potential energy storage location to the conveyor belt system; the evaluation system configured to engage the conveyor belt system to convey the material from the high potential energy storage location to the low potential energy storage location, while engaging the generator, when the power load on the electrical grid exceeds the power supply; and the evaluation system configured to engage the motor to convey the material from the low potential energy storage location to the high potential energy storage location, when the power supply on the electrical grid exceeds the power load.

The method for converting energy between electric, kinetic, and potential and storing potential energy may be arranged wherein the generator and the motor are the same electro-mechanical device.

The method for converting energy between electric, kinetic, and potential and storing potential energy may be arranged wherein the vertical lift height from the low potential energy storage location to the high potential energy storage location is greater than 300 meters.

The method for converting energy between electric, kinetic, and potential and storing potential energy may be arranged wherein the horizontal lift span from the low potential energy storage location to the high potential energy storage location is greater than 1.2 kilometers.

BRIEF DESCRIPTION OF THE SEVERAL VIEWS OF THE DRAWINGS

FIG. 4 is 1 is a highly schematic environmental view of another example of the disclosed bidirectional conveyor system for power storage and method for implementing the same.

FIG. 5 is a highly schematic view of one example of a luffing head component of one example of the disclosed bidirectional conveyor system.

FIG. 6 is a highly schematic view of one example of a section of one example of the disclosed bidirectional conveyor system with a substantially linear conveyor belt section.

FIG. 7 is a highly schematic view of one example of a section of one example of the disclosed bidirectional conveyor system with a curved conveyor belt section.

FIG. 8 is a cross-sectional end view of one example of a conveyor belt showing the composite materials thereof.

DETAILED DESCRIPTION OF THE DISCLOSURE

Figure 1:
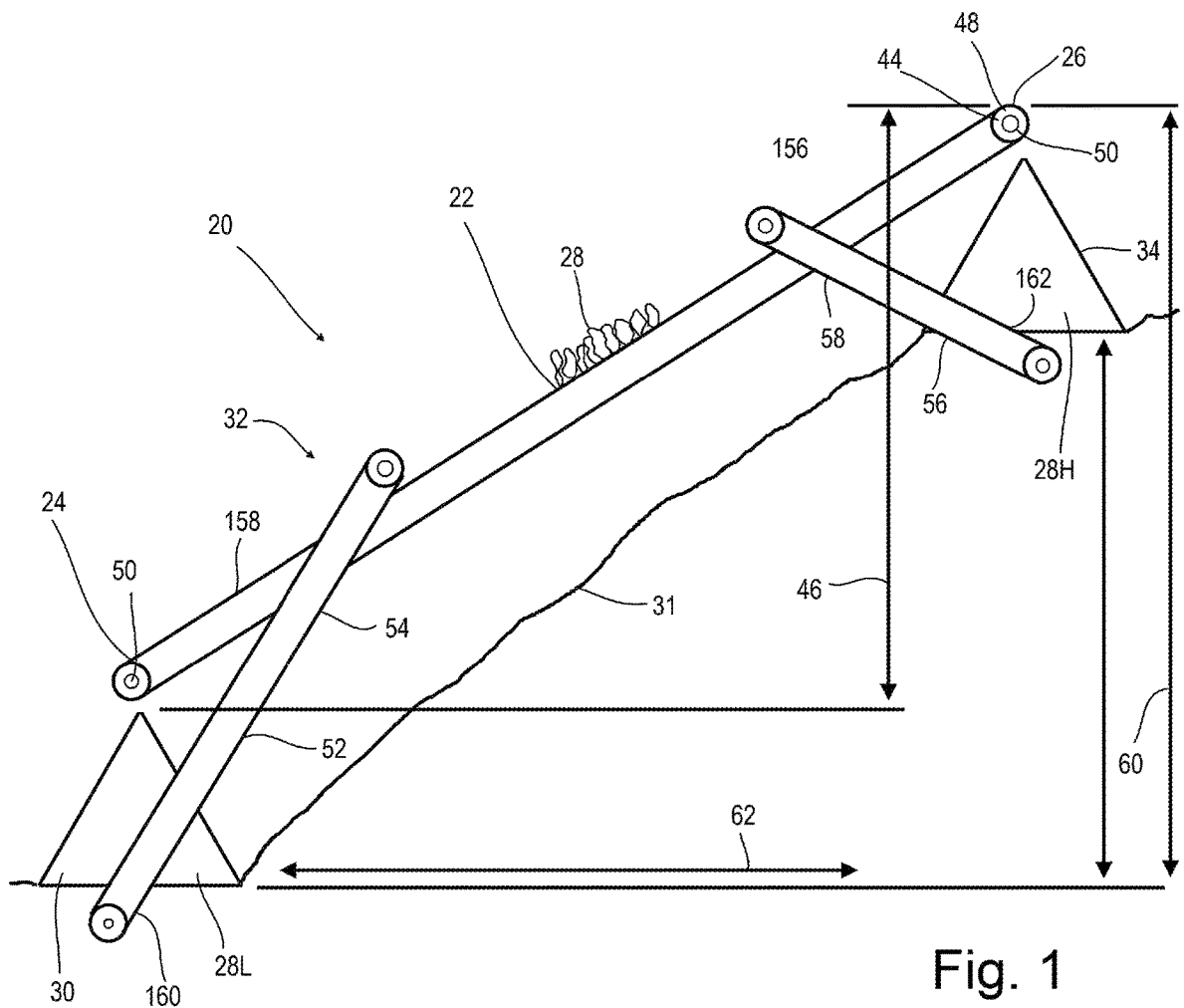
FIG. 1 is a highly schematic environmental view of one example of the disclosed bidirectional conveyor system for power storage.
Figure 2:
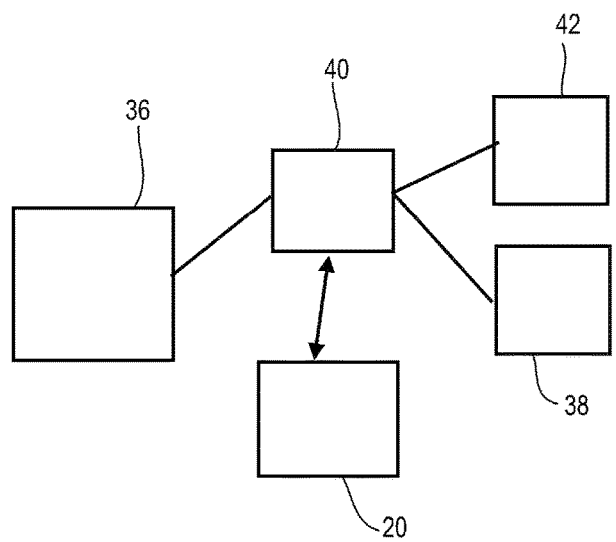
FIG. 2 is a block diagram of one example of several components of the system disclosed.
Figure 3:
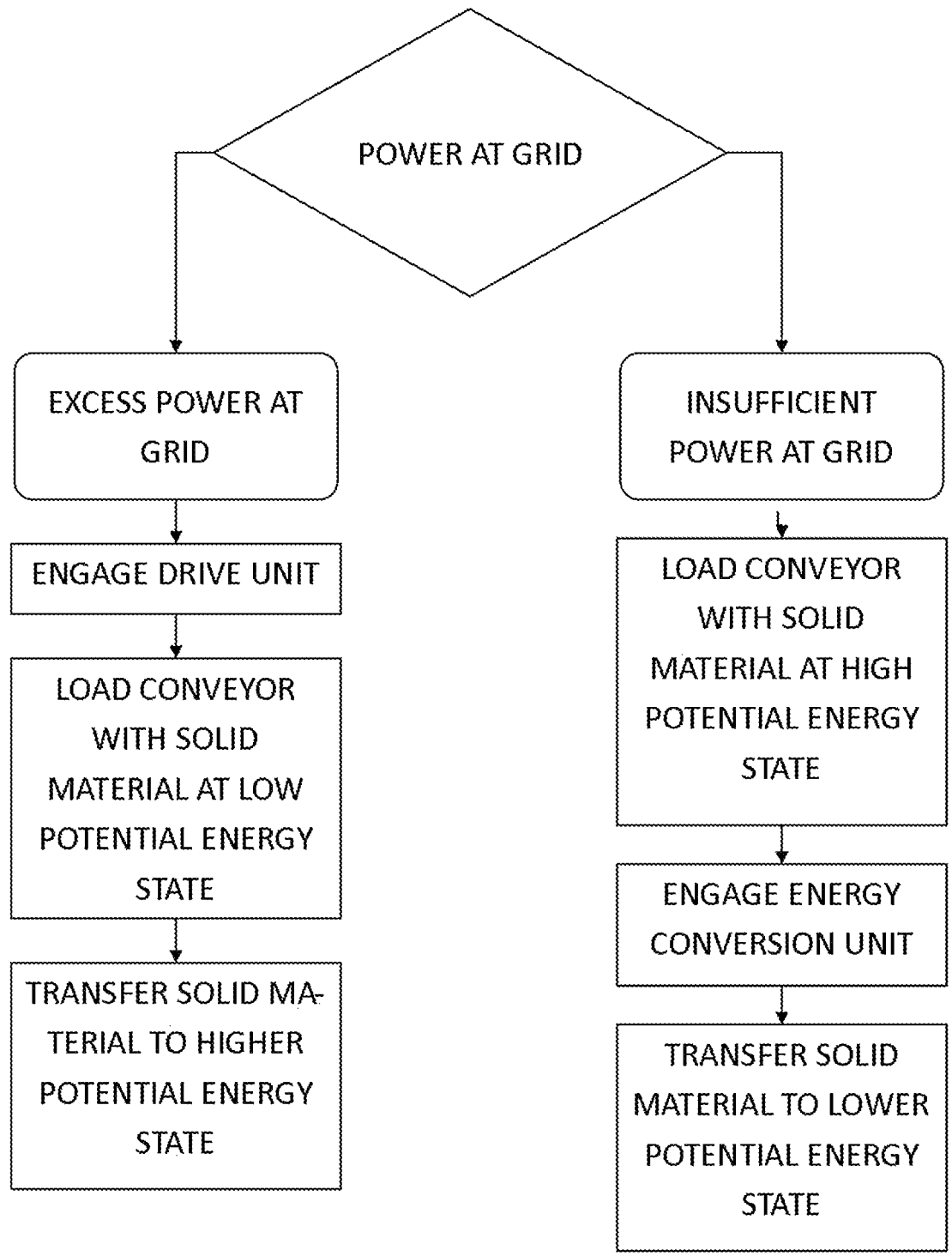
FIG. 3 is a flow chart diagram of one example of the method and system disclosed herein.

As renewable energy penetration grows, the increasing disparity between energy sources and electricity demand makes it more desired to capture electricity generated by hydrodynamic, wind, solar and other energy generation and store it for later use. Storage can help smooth fluctuations in generation especially those inherent in wind or solar energy.

An electrical grid (grid) or stationary utility energy storage commonly includes a range of technologies with the ability to store electric power on the grid and that allow stored electric power to be distributed as needed. The term "electrical grid" or "grid" used in this disclosure indicates an interconnected network of electric power transmission lines and associated distribution equipment for delivering electricity between producers and consumers. An electrical grid in many examples consists of generating stations that produce electrical power, high voltage transmission lines that carry power from often remote sources to demand centers, transformers altering the electric power, and distribution lines that connect individual customers. Energy storage systems enhance the reliability and resilience of the grid, often through short-term storage for peak-shaving and power quality uses and longer-term storage for load-leveling and load-shifting applications. As renewable energy sources such as wind and solar energy are installed, grid energy storage becomes an important tool to compensating for generation fluctuations of these sources on timescales ranging from seconds to hours. Some estimates suggest that 300 GW of additional wind energy requires 50 GW of conventional reserve to account for the variability added to the grid system.

Large-scale energy storage in some applications is a known concept. Current grids with storage systems use batteries, pumped hydro, and to a lesser extent, compressed air energy storage (CAES) for these purposes. These options are limited to geographically-appropriate sites. They have the advantage of fast response over other known systems.

Batteries provide another means of grid-level energy storage by converting electricity to chemical energy during times when power supply exceeds power demand. Unlike pumped hydro and CAES, battery storage is feasible for any geographical location but has additional costs, including losses over time (battery decay) and as such batteries commonly contain toxic chemicals, they incur high potential of disposal cost during disposal.

Thermal storage using molten salts or other media is another storage system, effective for concentrating solar power plants like the solar energy generating systems in the U.S. Mojave desert, and the Andasol plants near Granada, Spain. Thermal storage stabilizes fluctuations due to passing clouds and allows electricity to be produced after the hours of peak sunshine.

Flywheels are being effectively used in California and New York for frequency regulation. Superconducting magnetic energy storage (SMES) with a capacity of a few MJ are also used for regulating power quality.

Increased interest in electric power storage has led to a request for proposals for utility scale energy storage including each of the categories described here.

One significant advantage of the disclosed bidirectional conveyor system for power storage over battery systems, air compression systems, flywheel systems, and similar systems where loss of power occurs over time is that there is no power loss over time. Material 28 is raised from a low potential energy location 30 to a high potential energy location 34, and the power potential of the material 28 at this raised position is not lost over time. The material 28 may be stored at either location 30/34 indefinitely without loss of power (potential). In contrast, batteries for example decay when stored without a power potential, and the power potential contained in the chemical reaction of a battery also reduces over long storage periods. Likewise, large scale pressure systems, particularly those using large natural cavities in the earth are prone to pressure losses over time.

Use of electrical energy storage for utility applications can be divided into three categories: (1) for base load bulk power management, (2) for grid support in the form of distributed or load leveling storage, or (3) for power quality and peak power storage, including uninterruptable power supply applications. Within each of these broad categories, different timescales from seconds to hours apply. The purpose of the storage and the timescale of response determine which energy storage technologies are best suited for a given application. There exist a number of energy storage options, including several different battery chemistries.

Currently, the most pervasive use of large-scale chemical energy storage is for power quality in the form of uninter- rupted power supplies (UPS). UPS is used to protect expensive electrical assets such as computer data centers and critical infrastructure. Such systems do not require high-energy content since most power outages are less than a minute in length.

In addition to peak shaving, power storage can also help manage the transmission capacity for wind energy resources. By adding energy storage to a wind energy resource grid, wind plants located in remote areas can store energy from peak generation periods and use the energy at off-peak generation periods. Because the generated electricity can be stored rather than used as generated, such storage systems lower the need for transmission lines, and also allows use of power during peak usage periods, which do not usually correspond with peak wind generation periods.

The power generation from wind and solar energy sources can vary significantly, sometimes in a matter of seconds, and at other times over hours, days, or longer. The different time frames impose different energy storage requirements: (1) relatively low capacity but fast response for changes that occur within seconds or over a period of a few hours and (2) high capacity but slower response for changes that extend over one or more days.

Energy storage for grid applications is uncommon and, except for pumped hydroelectric storage, is only known to be used in pilot projects or site-specific projects. It is unknown how investment in energy storage technologies will be treated, how costs will be recovered, or whether energy storage technologies will be allowed in a particular regulatory environment.

Energy storage applications can provide functions related to both generation and transmission, further confusing the question of regulatory treatment of investments in grid level energy storage. For example, a utility can use bulk energy storage to store electricity generated during a low-cost period, such as late at night, to a time of high-cost generation, such as during peak daytime use. From a regulator's perspective, the energy supplied from the batteries during the peak period is equivalent to generation. Energy storage could also reduce transmission congestion, provide voltage support at a time of peak use, and provide other services that support transmission functions.

Another method and apparatus for storing energy utilizing a winch, cable, and weight system is disclosed in US Patent Application 2012/0112472 incorporated herein by reference. Such methods and devices have been attempted may times in the past. It is well known that cable strength requirements, tide/wave lift height and frequency, etc. cause significant detriments to such energy storage systems.

U.S. Pat. No. 8,593,012 also discloses an energy storage system, where each weight requires significant financial and space investment in rails, wheels, frame, etc. In addition, the conversion time from power storage mode to power generation mode is to slow for short term generation, and the storage available is limited to the number and size of the cars on hand.

To overcome these and other concerns, the bidirectional conveyor for power storage 20 disclosed in several; examples herein were conceived.

This bidirectional conveyor for power storage 20 in one example is a method and apparatus for converting energy between electric, kinetic, and potential, and storing the potential energy for later conversion back to kinetic and then electric energy.

The method of converting and storing energy, using the apparatus disclosed herein in one example comprising the step of providing a conveyor belt 22 having a lower end 24, and an upper end 26. The conveyor belt 22 of this example is configured to convey material 28 between the upper end 26 and the lower end 24 of the conveyor belt. In one example, the same conveyor belt is used to convey the material 28 in both directions, between the lower end 24 and the upper end 26. The example of the conveyor belt 22 in these examples is shown as a highly schematic representation of one component of a conveyor belt system 32 which may employ multiple conveyor belts and other apparatus. In use, the conveyor belt system 32 may include additional conveyor belts, separate lift and drop conveyor belts or apparatuses, tail rollers, luffing booms, a support structure, additional rollers, tensioning devices, additional drive units, sidewalls, etc.

The method of converting and storing energy disclosed herein in one example comprises a step of providing material 28 to be conveyed between the lower end 24 and the upper end 26 of the conveyor belt system 32 in both directions. This conveyed material 28 may be dirt, sand, gravel, slag, concrete, mine tailings, metal parts, or other material capable of being loaded and transported by the conveyor belt 22. Using such materials, the conveyed material may be easily procured with little or no expense, little manpower needs for inspection, etc., and no maintenance required of the material 28 itself. In one example the conveyed material 28 is chosen to be as dense (mass/volume) as is available to increase efficiency as comparted to the storage space required.

The method of converting and storing energy disclosed herein in one example also comprises a step of establishing a low potential energy storage location 30 where the conveyed material 28L is stored adjacent the lower end 24 of the conveyor belt. In one example this low potential energy storage location 30 is at one elevation of a natural slope 31 such as a hill, mountain, etc.

In this disclosure, general components and steps are labeled with a numeric identifier, with individual examples having a letter suffix. For example the material 28L is a specific example of the conveyed material 28, stored at the low potential storage location 30.

The proximity of the low potential energy storage location 30 adjacent the lower end 24 of this example of the conveyor belt system 32 allows for easy loading of the conveyor belt(s) 22 for transport of the conveyed material 28 to the high potential storage location 34 when the power supply on an electrical grid exceeds the power load on the electrical grid. As described above, such a situation may exist for example in a grid connected to a solar power source system on a sunny day, especially during off peak times. Another example is connected to a grid utilizing a wind power source when the power generated at the wind turbines exceeds the power load on the electrical grid.

The method disclosed herein in one example also comprises a step of establishing a high potential energy storage location 34 where the conveyed material 28H is stored adjacent the upper end 26 of the conveyor belt system 32. Again, this proximity of the high potential energy storage location 34 adjacent the upper end 26 of the conveyor belt system 32. This positioning allows for easy loading of the conveyor belt(s) 22 for transport of the conveyed material 28, for example when the power load 38 on the electrical grid exceeds the power supply 42. As described above, such a situation could exist for example in a grid connected to a solar power source system on a cloudy day, or at night, especially during peak times. Another example could exist in a grid connected to a wind power source when the power generated at the wind turbines cannot provide sufficient power to satisfy the power load on the electrical grid.

The method disclosed herein in one example also comprises the step of providing an evaluation system 36 configured to determine the electric power load 38 on the electrical grid 40 relative to the power supply 42 of the electrical grid 40. The evaluation system 36 may be human-actuated, electro-mechanical, electronic, software integrated hardware, or other systems capable of comparing the electric power load 38 on the electrical grid 40 relative to the power supply 42 on the electrical grid 40 and then indicating the results to an operator or connected system and/or actuating other systems.

The method may also comprise a step of coupling a generator 44 to the conveyor belt(s) 22. A generator defined herein as a machine that converts one form of energy into another, especially mechanical energy into electrical energy, as a dynamo. When the power load 38 on the electrical grid 36 exceeds the power supply 42, or when other conditions make it desirable to produce electric power, conveyed material 28H at the high potential storage location is loaded onto the conveyor belt 22 and then conveyed vertically downward through the drop (fall) height 46 on the conveyor belt, turning the generator 44 components, thus converting the stored potential energy of the stored conveyed material 28H at the high potential storage location to kinetic energy (thus moving the conveyor belt 22 and components of the generator 44) by way of gravity. Where the generator 44 is connected to the conveyor belt 22, movement of the conveyor belt 22 results in the kinetic energy of the moving conveyor belt being converted to electric energy as the rotor within the generator 44 rotates relative to a stator, or equivalents. The electric power is then be supplied (transmitted) to the electrical grid 40.

The method and apparatus disclosed here in one example may be utilized wherein the generator 44 is configured to generate electric power when the conveyor belt 22 conveys the conveyed material 28 from the high potential energy storage location 34 to the low potential energy storage location 30 as the rotor within the generator 44 rotates relative to a stator, or equivalents. The generator 44 in one example is coupled directly or through a filtering/distribution system to the electrical grid 40 so as to provide electric power to the power grid when needed.

Where the high potential storage location 34 is adjacent the conveyor belt 22, in one example directly below the conveyor belt 22; loading, and electric power generation may be very quickly started, on the order of less than a minute in some applications, and only limited by the amount of energy supplied by the mass (volume times density) of the material 28H stored at the high potential energy storage location 34. In one example the generator 44 is coupled to the axis of rotation of one or more shafts 50 supporting the conveyor belt 22 so as to more directly convert kinetic energy to electric power.

The method in one example also comprises the step of coupling a motor 48 to the conveyor belt(s) 22. The motor 48 configured to provide motive force to the conveyor belt(s) 22 to transport the conveyed material 28 from the low potential energy storage location 30 to the high potential energy storage location when the power supply 42 on the electrical grid 40 exceeds the power load 38, or when otherwise desired. In one example the motor 48 is also coupled to the axis of rotation of one or more shafts 50 supporting the conveyor belt 22. A motor defined in this disclosure as a machine that uses energy, such as electric, mechanical, or chemical energy (as from burning a fuel), to produce mechanical motion. This definition of the term motor including electrical engines, hydraulic actuators, pneumatic actuators, solenoids, etc. Combinations thereof are also intended to be encompassed by the term.

The method as disclosed herein may also provide a low potential loading system 52 configured to reposition the conveyed material 28L from the low potential energy storage location 30 to the lower end 24 of the conveyor belt 22. In the example shown, the low potential end loading system 52 comprises a second conveyor belt 54 extending from the low potential storage location 30 toward the lower end 24 of the conveyor belt 22. In one form, the low potential end loading system 52 is actuated by the evaluation system 36 when needed.

Similarly, the method and apparatus disclosed herein in one example comprises a step of providing a high potential loading system 56 configured to reposition the conveyed material 28 from the high potential energy storage location 34 toward the upper end 26 of the conveyor belt 22. In the example shown, the high potential end loading system 56 comprises a third conveyor belt 58 extending from the high potential storage location 34 toward the upper end 26 of the conveyor belt 22. In one example, the high potential end loading system 56 is actuated by the evaluation system 36 when needed.

In one example, the evaluation system 36 is configured to engage the loading system 56 and conveyor belt 22 to convey the conveyed material 28 from the high potential energy storage location 34 to the low potential energy storage location 30 and engage the generator 44 when the power load 38 on the electrical grid 40 exceeds the power supply 42 or other condition is reached. Similarly, the evaluation system 36 may be configured to engage the low potential end loading system 52 and the motor 48 to convey the conveyed material 28L from the low potential energy storage location 52 to the high potential energy storage location 34, when the power supply 42 on the electrical grid 40 exceeds the power load 38.

The method for converting energy between electric, kinetic, and potential and storing potential energy as disclosed herein may be configured wherein the generator 44 and the motor 48 are the same device.

The method for converting energy between electric, kinetic, and potential and storing potential energy may also be configured wherein the vertical lift height 60 measured from the low potential energy storage location 30 to the high potential energy storage location 34 is greater than 300 meters.

The method for converting energy between electric, kinetic, and potential and storing potential energy may be configured wherein the horizontal lift span 62 from the low potential energy storage location 30 to the high potential energy storage location 34 is greater than 1.2 kilometers.

Looking to FIG. 4 is shown another example of a bidirectional conveyor system 120 utilizing a lift conveyor belt 122 and a cooperative fall conveyor belt 124. The lift conveyor belt 122 of this example having a lower end 126 near the lowermost side 128 of the low potential storage location 30, and an upper end 130 near the uppermost side 132 of the high potential storage location. In one example, the lift conveyor 122 is dedicated for use in lifting the material 28 from the low potential storage location 30 to the high potential storage location 34 by utilizing motive force applied to the lift conveyor 122 by the motor or motors 48. In use, the motor 48 or motors drive the lift conveyor 122 and lift the material 28 from the low potential storage location 30 to the high potential storage location 34. This arrangement in one example generally negates or reduces the need for the low potential loading system 52 of the example shown in FIG. 1, although some loading system may be utilized. In one example, the low potential storage location may be configured to directly load material 28 onto the lower end 126 of the lift conveyor 122 by gravity or other easily accomplished methods and devices. Likewise, distribution to the high potential storage location 34 may be easily accomplished where the tail pulley or upper end 130 is directly above the uppermost side 132 of the high potential storage location and distribution may be accomplished by way of gravity, and/or a luffing head 146.

The fall conveyor 124 of one example as shown in FIG. 4 has an upper end 134 near the lowermost side 136 of the high potential storage location 34 and a lower end 138 near the uppermost side 140 of the low potential storage location. In this way, loading of material 28 onto the conveyor fall conveyor 124 may be easily accomplished. In one example the high potential loading system 56 is not needed in this example, loading accomplished, by gravity or e other apparatus, devices, methods, and devices. Likewise, distribution to the low potential storage location 30 may be easily accomplished. In one example the tail pulley or lower end 138 is directly above the uppermost side 140 of the low potential storage location and distribution may be accomplished by way of gravity, tail pulley, and/or a luffing head.

In the example shown in FIG. 4, the lift height 142 may be greater than the fall height 144, affecting the overall efficiency of the bidirectional conveyor for power storage 120.

To assist in increasing efficiency, luffing heads, or luffing booms may be utilized with the conveyor belts 22, 58, 54, 122, 124. Such luffing booms known for example in U.S. Pat. No. 6,185,847 incorporated herein by reference. A luffing head or luffing boom is generally a conveyor belt or section of a conveyor belt having at least one end which can be articulated vertically and/or horizontally as needed. A luffing boom may comprise a first conveyor belt and a second conveyor belt where material discharges from the first conveyor onto a second conveyor which may be longitudinally aligned with the first conveyor and the second conveyor belt has a material receiving point located below a discharge point of the first conveyor. The first end of the first conveyor may be vertically moved by virtue of a boom and cable configuration, hydraulic actuators, or equivalents.

A highly schematic view of one example of a luffing boom 80 is shown in FIG. 5, adjacent to and cooperating with a conveyor belt 82. The luffing boom 80 in this example meeting the conveyor belt 82 at a roller 84 which may be a driver or an idler. Other connection and conveyor to conveyor transfer arrangements are known, such as vertically positioning a first conveyor belt below the discharge of a second conveyor belt, luffing head, etc., allowing for continuous conveyance. In another example the adjacent ends of the luffing boom 80 and conveyor belt are aligned to allow direct conveyance from one to the other, or in another example the luffing boom 80 may be an extension of the conveyor belt 82. In the examples shown, utilizing a luffing boom 80 at the discharge end of a conveyor belt maximizes the lift height of a lifting conveyor belt, or maximizes the drop height of a fall conveyor. Either arrangement increasing efficiency of the overall apparatus.

In this example of FIG. 5 the luffing boom 80 has a distal end 86 movable vertically from a first position 88A conforming to a first pile height of material 28A, to a second position 88B conforming to a (larger) second pile height 28B, to a third position 88C conforming to a (still larger)

third pile height 28C, and positions there between. Such an arrangement maximizing efficiency as described herein.

In one example, a luffing head 146 (e.g. 146A, 146B) may be utilized at the upper end 130 of the lift conveyor 122. The luffing head 146 adjustable vertically and/or horizontally depending on the height or lateral position of the material 28H at the high potential storage location 34. The luffing boom 146 in this position adjusts from the position 146A to the position 146B; increasing efficiency as the height of the pile of material 28H at the high potential storage location 34 changes due to addition or removal of the material 28H.

Similarly, in one example a luffing boom 148 (e.g. 148A, 148B) may be utilized near the lower end 126 of the lift conveyor 122 The luffing boom 148 adjustable vertically and/or horizontally depending on the height or lateral position of the material 28L at the low potential storage location 30. The luffing boom 148 in this example adjusts from a first position 148A to a second position 148B; increasing efficiency as the height of the pile of material 28L at the low potential storage location 30 changes due to addition or removal of the material 28L. FIG. 4 for example shows an adjusted lift height 150, substantially less than the full lift height 142. As this method utilizing luffing head(s) 146/148 minimizes the vertical lift distance (142 to 150) the material 28 is raised from the low potential storage location 30 to the high potential storage location 34, efficiency may be increased. This efficiency improvement is accomplished as less power is used to raise the material 28 from the low potential storage location 30 to the high potential storage location 34.

The fall conveyor of the example shown in FIG. 4 may similarly use luffing heads (luffing booms). In one example, a luffing head 152 is used near the upper end 134 of the fall conveyor 124. This luffing head 152 vertically and/or horizontally adjusts the upper end 134 of the fall conveyor, maximizing the fall height 144; and thus increasing efficiency of the apparatus, allowing more electric power to be generated from the generator 44 attached thereto. Similarly, a luffing head 154 (e.g. 154A, 154B) may be used near the lower end 138 of the fall conveyor 124. This luffing head 154 vertically and/or horizontally adjusts the lower end 138 of the fall conveyor 124 maximizing the fall height 144; and thus increasing efficiency of the apparatus, allowing more electric power to be generated from the generator 44 attached thereto.

Luffing heads may also be utilized in the example shown in FIG. 1 with a bidirectional conveyor. In this example a luffing head 156 may be utilized at the upper end 26 of the conveyor belt 22, adjusting the lift height 60 and/or drop height 46 to maximize efficiency.

Similarly, a luffing boom 158 may be utilized at the lower end 24 of the conveyor belt 22, adjusting the lift height 60 and/or drop height 46 to maximize efficiency generally as disclosed above.

In another example, also shown in FIG. 1 the second conveyor belt 54 extending from the low potential storage location 30 toward the lower end 24 of the conveyor belt 22 may utilize a luffing boom. In such an example the distal end 160 of the second conveyor belt 54 may be vertically and/or horizontally moved to maximize the fall height 46 or to minimize the lift height 60 depending on which direction the conveyor belt 22 is moving material 20 between the low storage potential location 30 and the high potential storage location 34.

Similarly, the third conveyor belt 58 extending from the high potential storage location 34 toward the upper end 26 of the conveyor belt 22 may utilize a luffing boom. In such an example the distal end 162 may be vertically and/or horizontally moved to maximize the fall height 46 or to minimize the lift height 60 depending on which direction the conveyor belt 22 is moving material 20 between the low storage potential location 30 and the high potential storage location 34.

Where a luffing head is used at the loading end of a conveyor, a rake system or other apparatus may be included to improve efficiency at the loading end.

Looking to the example of FIG. 7 is shown a concave curve conveyor belt 202. By way of comparison, FIG. 6 shows an example utilizing a linear conveyor belt section 204. The linear conveyor belt 204 shown riding on rollers (idlers) 206 with tension being applied along lines of force shown at 208 in one direction and at 210 in a second direction. As the tension is increased in directions 208/210 the conveyor belt 204 continues to ride on the rollers 206. Thus the conveyor belt 204 and material 28 continues to be supported by the rollers 206 along the length thereof.

FIG. 7 shows the example utilizing a concave curved conveyor belt 202. One example of this is also shown in FIG. 4, where the lift conveyor 122 and/or fall conveyor 124 is concave, or has a concave region thereof. In such an example, as tension is increased in directions 212/214, the conveyor belt is tensioned linearly there between and when the tension between 212-214 overcomes the weight of the belt 202 and any material 28 thereon, the belt tends to lift in direction 216, off of the idlers 218 from the position 220A riding on one or more of the idlers 218, to position 220B off of the idlers 218, to position 220C, to position 220C. Position 220C shows the conveyor belt 202 nearly linear, which is one maximum arrangement allowed. When configured correctly, this concave system 200 reduces overall friction of the system 200 by reducing or eliminating the rolling friction of the rollers/idlers 218.

Friction is not only inherent in the rolling friction of the rollers or idlers. Other frictions are present in the system, including rolling resistance of a conveyor belt over idlers, rollers, etc. where the material of the conveyor belt needs to deform slightly as it rolls over such rollers or supporting components.

Disclosed herein is an improvement in part overcoming this rolling resistance where the conveyor belt comprises a first material in contact with the conveyed material 28 configured to increase wear resistance from the material 28 and a second material configured to reduce rolling resistance.

The conveyor belt in one example comprises a composition formulated for low rolling resistance. Similar materials used are known for use in vehicle tires, such as that disclosed in U.S. Pat. No. 4,444,236 incorporated herein by reference.

Disclosed herein as shown in FIG. 8 is a conveyor belt 300 formed of a composition 302 having a first layer 304 with a first rolling resistance, and a first wear resistance. The first layer 304 directly supporting the conveyed material 28, thus requiring a substantial wear resistance to the conveyed material which may have hard, sharp edges and may be dense. Wherein the conveyed material 28 may be substantially hard (rock etc.) and may have rough edges rubbing against the first layer 304, the wear resistance of the first layer 304 is of a higher concern that other layers. In one example, the wear resistance of the first layer 304 is higher than the wear resistance of a second layer 306 forming the surface of the conveyor belt which is in contact with the rollers or idlers 308.

The composition 302 of the conveyor belt 300 of this example may also comprise the second layer 306 having a second rolling resistance and a second wear resistance. In another example the second material is the same as the first material. In the example shown, the second material 306 is configured to minimize roll resistance against the roller(s) or idler(s) 308. As the rollers or idlers 308 are often smooth, and little wear resistance is required, rolling resistance can be minimized.

To add structural support to the conveyor belt, a middle, third, or gum layer 312 may be provided. In one example this third layer 312, includes tension resistance material 310 such as a cable or cables, strong fabric, or other woven or pressed material such as Kevlar, polyester, nylon, etc., this tension resisting material 310 extending longitudinally along the conveyor belt 300. In one example the tension resisting materials include cables, the cables are steel or other metals, polymers, fiberglass, carbon fiber, or other filaments or strings.

Wherein the first material 304 directly supports the conveyed material 28, the first material 304 in one example has a higher wear resistance than the second material 306. In some examples, wear resistance is often inversely relative to rolling resistance. In one example, the first material 304 has a higher rolling resistance than the second material 306.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A method for converting energy between electric, kinetic, and potential and storing potential energy; the method comprising the steps of:
   providing at least one conveyor belt system having a lower end, an upper end;
   the conveyor belt system configured to move conveyed material between the upper end and the lower end in both directions;
   providing conveyed material to be moved between the lower end and the upper end of the conveyor belt;
   establishing a low potential energy storage location where the conveyed material is stored adjacent the lower end of the conveyor belt system;
   establishing a high potential energy storage location where the conveyed material is stored adjacent the upper end of the conveyor belt system;
   providing an evaluation system configured to determine the electric power load on an electrical grid relative to the power supply on the electrical grid;
   coupling a generator to the conveyor belt system;
   the generator configured to generate electric power when the conveyor belt system conveys the conveyed material from the high potential energy storage location to the low potential energy storage location;
   the generator coupled to the electrical grid to provide electric power thereto;
   coupling a motor to the conveyor belt system, the motor configured to provide motive force to the conveyor belt system to move the conveyed material from the low potential energy storage location to the high potential energy storage location;
   providing a low potential loading system configured to reposition the conveyed material from the low potential energy storage location to the lower end of the conveyor belt system;
   providing a high potential loading system configured to reposition the conveyed material from the high potential energy storage location to the upper end of the conveyor belt system;
   the evaluation system configured to engage the conveyor belt system to convey the conveyed material from the high potential energy storage location to the low potential energy storage location, while engaging the generator, when the power load on the electrical grid exceeds the power supply; and
   the evaluation system configured to engage the motor to move the conveyed material from the low potential energy storage location to the high potential energy storage location, when the power supply on the electrical grid exceeds the power load.

2. The method for converting energy between electric, kinetic, and potential and storing potential energy as recited in claim 1 wherein the generator and the motor are the same electro-mechanical device.

3. The method for converting energy between electric, kinetic, and potential and storing potential energy as recited in claim 1 wherein the vertical lift height from the low potential energy storage location to the high potential energy storage location is greater than 300 meters.

4. The method for converting energy between electric, kinetic, and potential and storing potential energy as recited in claim 1 wherein the horizontal lift span from the low potential energy storage location to the high potential energy storage location is greater than 1.2 kilometers.

5. The method for converting energy between electric, kinetic, and potential and storing potential energy as recited in claim 1 wherein the conveyor belt system comprises a lift conveyor and a cooperating fall conveyor.

6. The method for converting energy between electric, kinetic, and potential and storing potential energy as recited in claim 5 wherein at least a portion of the lift conveyor is concave in a vertical plane wherein increase of a tension of the lift conveyor rises the lift conveyor off of at least one support roller.

7. The method for converting energy between electric, kinetic, and potential and storing potential energy as recited in claim 5 wherein at least a portion of the fall conveyor is concave in a vertical plane wherein increase of a tension of the lift conveyor rises the lift conveyor off of at least one support roller.

8. The method for converting energy between electric, kinetic, and potential and storing potential energy as recited in claim 1 wherein the conveyor belt system comprises:
   a conveyor belt formed of a first layer optimized for contact with the conveyed material,
   a second layer optimized to reduce rolling resistance, and
   a third layer between the first layer and the second layer, the third layer optimized for tension resistance.

9. The method for converting energy between electric, kinetic, and potential and storing potential energy as recited in claim 1 wherein the conveyor belt system comprises at least one discharge end, wherein the discharge end comprises a luffing head.

* * * * *